US012019637B2

(12) United States Patent
Macy, III et al.

(10) Patent No.: US 12,019,637 B2
(45) Date of Patent: Jun. 25, 2024

(54) SYSTEMS AND METHODS FOR ALTERING A GRAPHICAL USER INTERFACE BASED ON EXPLORATION OF SEARCH QUERY RANKING

(71) Applicant: Walmart Apollo, LLC, Bentonville, AR (US)

(72) Inventors: Robert Wayne Macy, III, Davis, CA (US); Nimit Kamlesh Desai, Jersey City, NJ (US); Jiahao Zhang, Sunnyvale, CA (US); Shubham Vishwanath Barhate, Toronto (CA); Zhenrui Wang, Fremont, CA (US); Rini Vipinchandra Joshi, Sunnyvale, CA (US); Nitin Shailesh Baliga, San Jose, CA (US); Rajyashree Mukherjee, San Carlos, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 189 days.

(21) Appl. No.: 17/588,553

(22) Filed: Jan. 31, 2022

(65) Prior Publication Data
US 2023/0244676 A1 Aug. 3, 2023

(51) Int. Cl.
*G06F 16/2457* (2019.01)
*G06F 16/248* (2019.01)

(52) U.S. Cl.
CPC ...... *G06F 16/24578* (2019.01); *G06F 16/248* (2019.01)

(58) Field of Classification Search
CPC ............... G06F 16/248; G06F 16/24578
See application file for complete search history.

(56) References Cited

U.S. PATENT DOCUMENTS 9,563,705 B2    2/2017 Taank et al.
9,779,441 B1 * 10/2017 Jadhav .............. G06F 16/353
(Continued)

OTHER PUBLICATIONS

Gupta, P., et al., "Treating Cold Start in Product Search by Priors," WWW '20 Companion, Apr. 20-24, 2020, Taipei, Taiwan, https://doi.org/10.1145/3366424.3382705 (2 pages) Apr. 20, 2020.
(Continued)

*Primary Examiner* — Hau H Hoang
(74) *Attorney, Agent, or Firm* — BRYAN CAVE LEIGHTON PAISNER LLP (57) ABSTRACT

A systems including one or more processors and one or more non-transitory computer readable media storing computing instructions that, when executed on the one or more processors, perform: receiving in-session user activity information, the in-session user activity information comprising a user search query from a user and a ranked list of products to be displayed to the user based on the user search query, and a product of the products being part of a boost category; determining a respective content model prediction score for each of the products of the ranked list of the products; determining a respective discounted cumulative gain (DCG) score for each of the products of the ranked list of the products; analyzing the product that is part of the boost category to determine if the product is to be repositioned within the ranked list of the products based on the respective DCG score for each of the products; and in response to determining that the product that is part of the boost category is to be repositioned, transmitting instructions to modify a graphical user interface to display the ranked list of the products with the product repositioned within the ranked list of the products. Other embodiments are described.

20 Claims, 6 Drawing Sheets

400

410 — Receiving in-session user activity information

420 — Determining a respective content model prediction score for a ranked list of products 430 — Determining a respective DCG score for the ranked list of products 440 — Analyzing a product that is part of a boost category to determine if the product is to be repositioned within the ranked list of products 450 — Transmitting instructions to modify a GUI to display the ranked list of products with the product repositioned within the ranked list of the products

(56) References Cited

U.S. PATENT DOCUMENTS

| | | |
|---|---|---|
| 10,685,374 B2 | 6/2020 | Shah et al. |
| 11,062,372 B2 | 7/2021 | Jadhav et al. |
| 11,176,592 B2 | 11/2021 | Xie et al. |
| 2012/0209831 A1* | 8/2012 | Rehman ............... G06F 16/248 707/723 |
| 2014/0122469 A1* | 5/2014 | Chang .................. G06Q 30/06 707/725 |
| 2017/0024663 A1* | 1/2017 | Liu ........................ G06N 20/00 |
| 2018/0253759 A1 | 9/2018 | Deng et al. |
| 2021/0097471 A1* | 4/2021 | Inamdar ................ G06N 20/00 |
| 2021/0118034 A1* | 4/2021 | Indrakanti ............ G06F 16/248 |
| 2022/0351239 A1* | 11/2022 | Eletreby ............... G06F 16/953 |

OTHER PUBLICATIONS

Wu, Y., et al., "Conservative Bandits," arXiv:1602.04282v1 [stat. ML] (13 pages) Feb. 13, 2016.

\* cited by examiner

| | Boost Candidate | Rerank Score | DCG with Boost | Boost Test | Placed Item | Running RerankDCG |
|---|---|---|---|---|---|---|
| Step 1 | Rover | 0.4 | 0.4 | | Item1 | 0.9 |
| Step 2 | Rover | 0.4 | 1.15 | | Item2 | 1.4 |
| Step 3 | Rover | 0.4 | 1.60 | | Rover | 1.60 |
| Step 4 | Warm Start | 0.5 | 1.82 | | Warm Start | 1.82 |
| Step 5 | Cold Start | 0.3 | 1.94 | | Item3 | 2.05 |
| Step 6 | Cold Start | 0.3 | 2.16 | | Cold Start | 2.16 |

FIG. 6

SYSTEMS AND METHODS FOR ALTERING A GRAPHICAL USER INTERFACE BASED ON EXPLORATION OF SEARCH QUERY RANKING

TECHNICAL FIELD

This disclosure relates generally to search query ranking, and more particularly to systems and methods for altering a graphical user interface based on exploration of search query ranking.

BACKGROUND

Search engines are an integral part of most computing systems. Typically, a user inputs a query into a search engine and receives a number of results. However, these results may not be what the user was looking for. This results in the user inputting additional queries that can burden the computing system and frustrate the user. In some embodiments, a query suggestion system can be employed to provide suggested queries to the user. However, the results of the query suggestion system may further frustrate the user and/or reduce an efficiency of the computing system.

BRIEF DESCRIPTION OF THE DRAWINGS

To facilitate further description of the embodiments, the following drawings are provided in which.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

A number of embodiments can include a system. The system can include one or more processors and one or more non-transitory computer-readable storage devices storing computing instructions. The computing instructions can be configured to run on the one or more processors and perform: receiving in-session user activity information, the in-session user activity information comprising a user search query from a user and a ranked list of products to be displayed to the user based on the user search query, and a product of the products being part of a boost category; determining a respective content model prediction score for each of the products of the ranked list of the products; determining a respective discounted cumulative gain (DCG) score for each of the products of the ranked list of the products; analyzing the product that is part of the boost category to determine if the product is to be repositioned within the ranked list of the products based on the respective DCG score for each of the products; and in response to determining that the product that is part of the boost category is to be repositioned, transmitting instructions to modify a graphical user interface to display the ranked list of the products with the product repositioned within the ranked list of the products.

Various embodiments include a method. The method can be implemented via execution of computing instructions configured to run at one or more processors and configured to be stored at non-transitory computer-readable media. The method can comprise receiving in-session user activity information, the in-session user activity information comprising a user search query from a user and a ranked list of products to be displayed to the user based on the user search query, and a product of the products being part of a boost category; determining a respective content model prediction score for each of the products of the ranked list of the products; determining a respective discounted cumulative gain (DCG) score for each of the products of the ranked list of the products based on a respective re-ranking model score; analyzing the product that is part of the boost category to determine if the product is to be repositioned within the ranked list of the products based on the respective DCG score for each of the products; and in response to determining that the product that is part of the boost category is to be repositioned, transmitting instructions to modify a graphical user interface to display the ranked list of the products with the product repositioned within the ranked list of the products.

Figure 1:
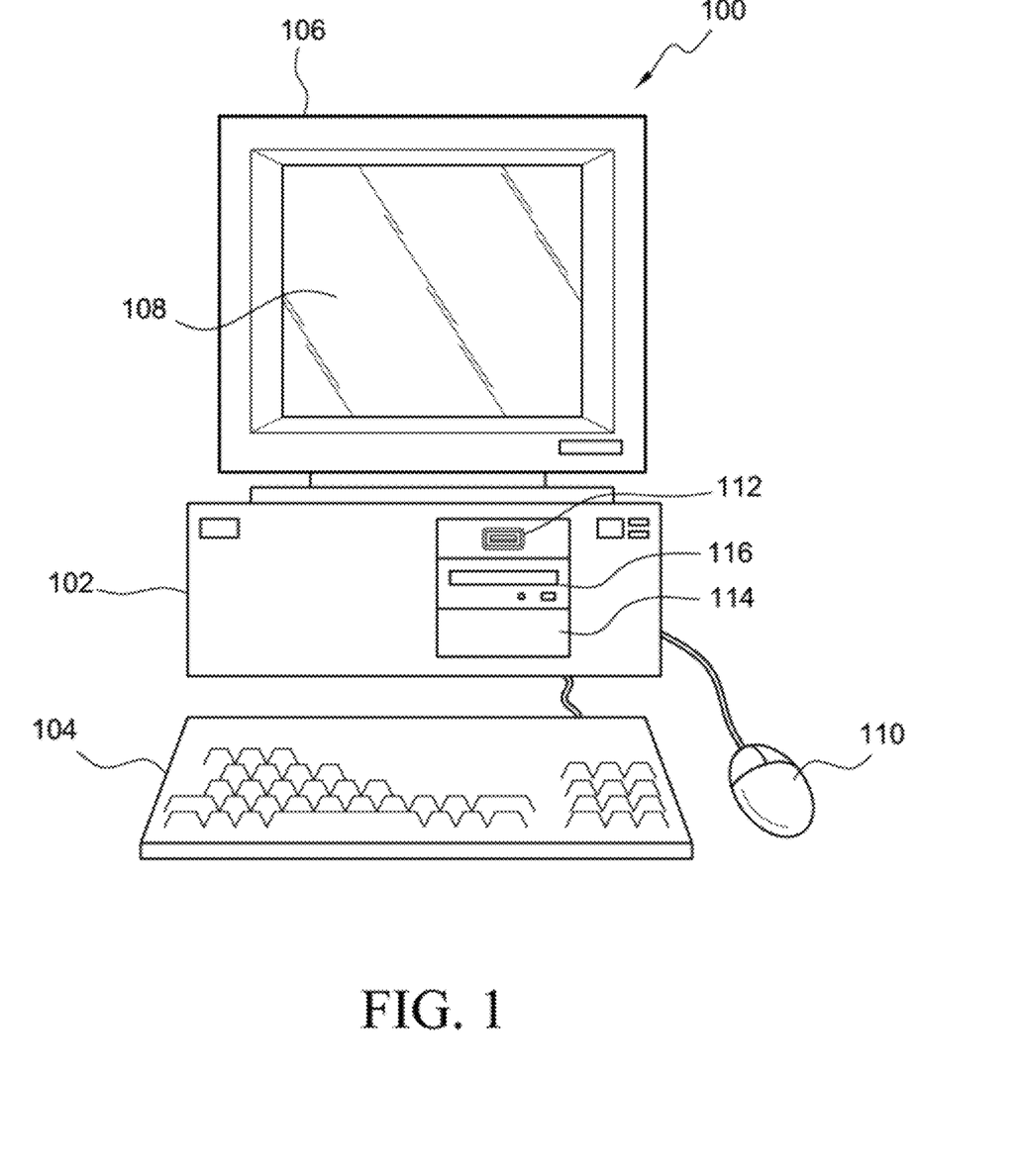
FIG. 1 illustrates a front elevational view of a computer system that is suitable for implementing various embodiments of the systems disclosed in FIG. 3.
Figure 2:
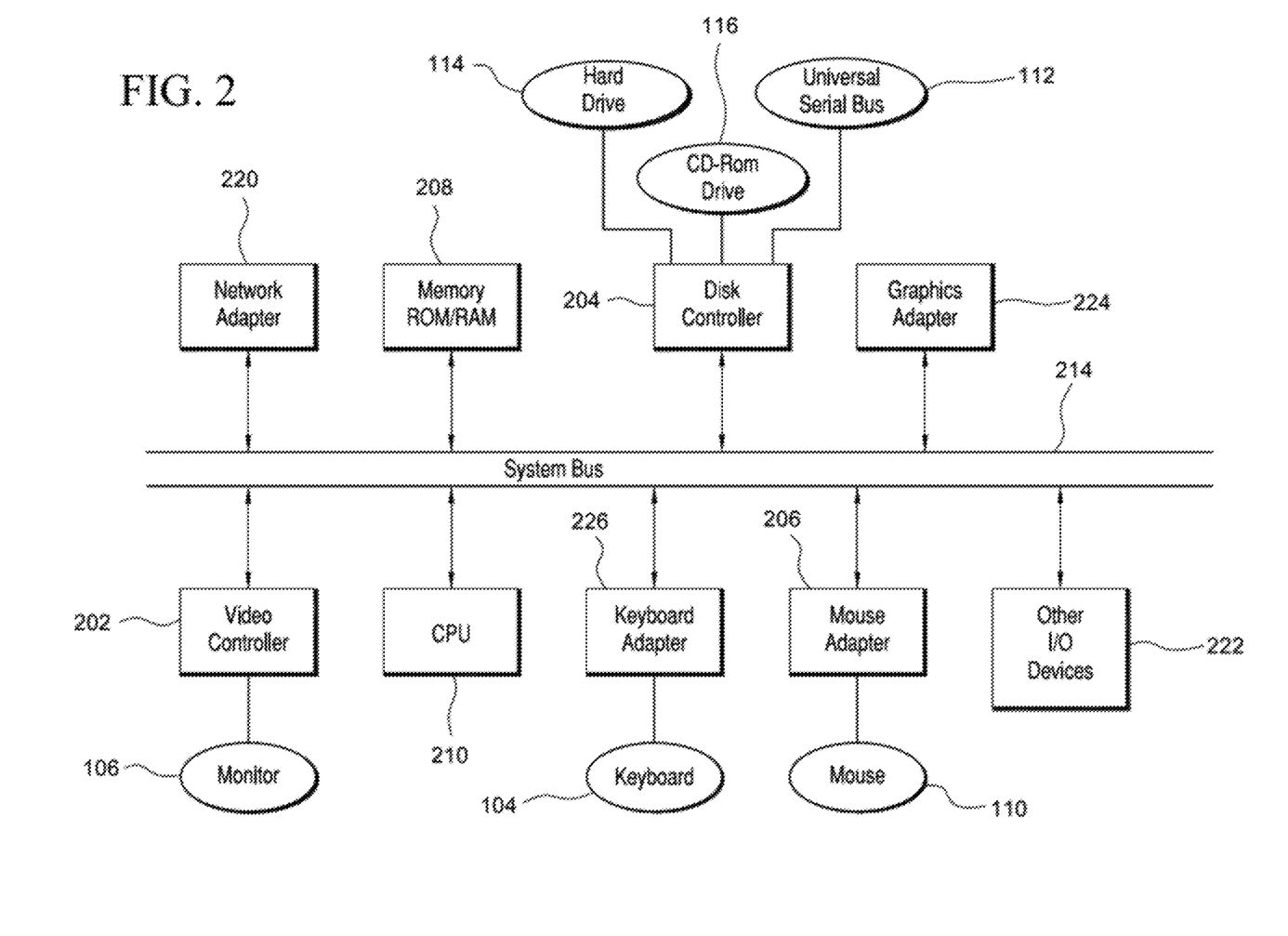
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In these or other embodiments, memory storage unit 208 can comprise (i) non-transitory memory and/or (ii) transitory memory.

In many embodiments, all or a portion of memory storage unit 208 can be referred to as memory storage module(s) and/or memory storage device(s). In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Washington, United States of America, (ii) Mac® OS X by Apple Inc. of Cupertino, California, United States of America, (iii) UNIX® OS, and (iv) Linux® OS. Further exemplary operating systems can comprise one of the following: (i) the iOS® operating system by Apple Inc. of Cupertino, California, United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, California, United States of America, (v) the Windows Mobile™ operating system by Microsoft Corp. of Redmond, Washington, United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
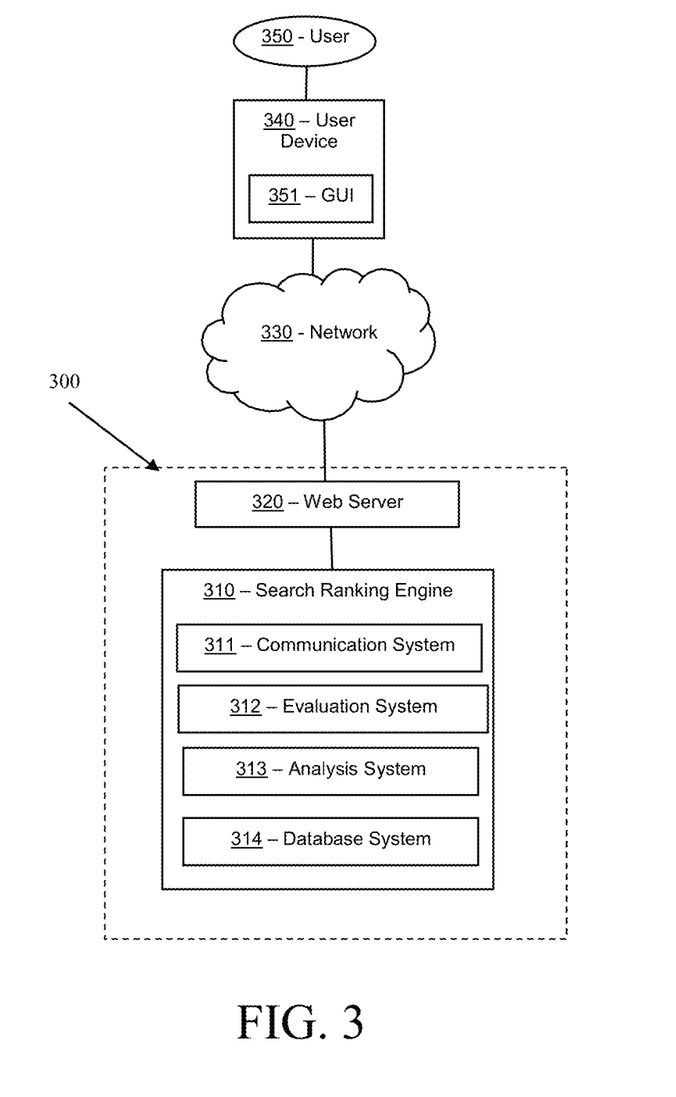
FIG. 3 illustrates a representative block diagram of a system, according to an embodiment.

Turning ahead in the drawings, FIG. 3 illustrates a block diagram of a system 300 that can be employed for performing geographical experiment analysis, according to an embodiment. System 300 is merely exemplary and embodiments of the system are not limited to the embodiments presented herein. The system can be employed in many different embodiments or examples not specifically depicted or described herein. In some embodiments, certain elements, modules, or systems of system 300 can perform various procedures, processes, and/or activities. In other embodiments, the procedures, processes, and/or activities can be performed by other suitable elements, modules, or systems of system 300. In some embodiments, system 300 can include a search ranking engine 310 and/or web server 320.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

Search ranking engine 310 and/or web server 320 can each be a computer system, such as computer system 100 (FIG. 1), as described above, and can each be a single computer, a single server, or a cluster or collection of computers or servers, or a cloud of computers or servers. In another embodiment, a single computer system can host search ranking engine 310 and/or web server 320. Additional details regarding search ranking engine 310 and/or web server 320 are described herein.

In some embodiments, web server 320 can be in data communication through a network 330 with one or more user devices, such as a user device 340, which also can be part of system 300 in various embodiments. User device 340 can be part of system 300 or external to system 300. In certain embodiments, user device 340 can be a desktop computers, laptop computers, smart phones, tablet devices, and/or other endpoint devices. Network 330 can be the Internet or another suitable network. In some embodiments, user device 340 can be used by users, such as a user 350. In many embodiments, web server 320 can host one or more websites and/or mobile application servers. For example, web server 320 can host a website, or provide a server that interfaces with an application (e.g., a mobile application), on user device 340, which can allow users (e.g., 350) to analyze search queries and ranked lists of products, in addition to other suitable activities. In a number of embodiments, web server 320 can interface with search ranking engine 310 when a user (e.g., 350) is performing search ranking analysis.

In some embodiments, an internal network that is not open to the public can be used for communications between search ranking engine 310 and web server 320 within system 300. Accordingly, in some embodiments, search ranking engine 310 (and/or the software used by such systems) can refer to a back end of system 300 operated by an operator and/or administrator of system 300, and web server 320 (and/or the software used by such systems) can refer to a front end of system 300, as is can be accessed and/or used by one or more users, such as user 350, using user device 340. In these or other embodiments, the operator and/or administrator of system 300 can manage system 300, the processor(s) of system 300, and/or the memory storage unit(s) of system 300 using the input device(s) and/or display device(s) of system 300.

In certain embodiments, the user devices (e.g., user device 340) can be desktop computers, laptop computers, mobile devices, and/or other endpoint devices used by one or more users (e.g., user 350). A mobile device can refer to a portable electronic device (e.g., an electronic device easily conveyable by hand by a person of average size) with the capability to present audio and/or visual data (e.g., text, images, videos, music, etc.). For example, a mobile device can include at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can include a volume and/or weight sufficiently small as to permit the mobile device to be easily conveyable by hand. For examples, in some embodiments, a mobile device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile device can weigh less than or equal to 15.6 Newtons, 17.8 Newtons, 22.3 Newtons, 31.2 Newtons, and/or 44.5 Newtons.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, California, United States of America; (ii) the Eye Tap™ product, the Laser Eye Tap™ product, or a similar product by ePI Lab of Toronto, Ontario, Canada, and/or (iii) the Raptyr™ product, the STAR1200™ product, the Vuzix Smart Glasses M100™ product, or a similar product by Vuzix Corporation of Rochester, New York, United States of America. In other specific examples, a head mountable wearable user computer device can comprise the Virtual Retinal Display™ product, or similar product by the University of Washington of Seattle, Washington, United States of America. Meanwhile, in further specific examples, a limb mountable wearable user computer device can comprise the iWatch™ product, or similar product by Apple Inc. of Cupertino, California, United States of America, the Galaxy Gear or similar product of Samsung Group of Samsung Town, Seoul, South Korea, the Moto 360 product or similar product of Motorola of Schaumburg, Illinois, United States of America, and/or the Zip™ product, One™ product, Flex™ product, Charge™ product, Surge™ product, or similar product by Fitbit Inc. of San Francisco, California, United States of America.

Exemplary mobile devices can include (i) an iPod®, iPhone®, iTouch®, iPad®, MacBook® or similar product by Apple Inc. of Cupertino, California, United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile device can include an electronic device configured to implement one or more of (i) the iPhone® operating system by Apple Inc. of Cupertino, California, United States of America, (ii) the Blackberry® operating system by Research In Motion (RIM) of Waterloo, Ontario, Canada, (iii) the Android™ operating system developed by the Open Handset Alliance, or (iv) the Windows Mobile™ operating system by Microsoft Corp. of Redmond, Washington, United States of America.

In many embodiments, search ranking engine 310 and/or web server 320 can each include one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to search ranking engine 310 and/or web server 320 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processor(s) and/or the memory storage unit(s). In some embodiments, the KVM switch also can be part of search ranking engine 310 and/or web server 320. In a similar manner, the processors and/or the non-transitory computer-readable media can be local and/or remote to each other.

Meanwhile, in many embodiments, search ranking engine 310 and/or web server 320 also can be configured to communicate with one or more databases, such as a database system 314. The one or more databases can include geographical experiment information, user activity information, and/or machine learning training data, for example, among other data as described herein. The one or more databases can be stored on one or more memory storage units (e.g., non-transitory computer readable media), which can be similar or identical to the one or more memory storage units (e.g., non-transitory computer readable media) described above with respect to computer system 100 (FIG. 1). Also, in some embodiments, for any particular database of the one or more databases, that particular database can be stored on a single memory storage unit or the contents of that particular database can be spread across multiple ones of the memory storage units storing the one or more databases, depending on the size of the particular database and/or the storage capacity of the memory storage units.

The one or more databases can each include a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, search ranking engine 310, web server 320, and/or the one or more databases can be implemented using any suitable manner of wired and/or wireless communication. Accordingly, system 300 can include any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

In many embodiments, search ranking engine 310 can include a communication system 311, an evaluation system 312, an analysis system 313, and/or database system 314. In many embodiments, the systems of search ranking engine 310 can be modules of computing instructions (e.g., software modules) stored at non-transitory computer readable media that operate on one or more processors. In other embodiments, the systems of search ranking engine 310 can be implemented in hardware. Search ranking engine 310 and/or web server 320 each can be a computer system, such as computer system 100 (FIG. 1), as described above, and can be a single computer, a single server, or a cluster or collection of computers or servers, or a cloud of computers or servers. In another embodiment, a single computer system can host search ranking engine 310 and/or web server 320. Additional details regarding search ranking engine 310 and the components thereof are described herein.

In many embodiments, user device 340 can comprise graphical user interface ("GUI") 351. In the same or different embodiments, GUI 351 can be part of and/or displayed by user device 340, which also can be part of system 300. In some embodiments, GUI 351 can comprise text and/or graphics (image) based user interfaces. In the same or different embodiments, GUI 351 can comprise a heads up display ("HUD"). When GUI 351 comprises a HUD, GUI 351 can be projected onto a medium (e.g., glass, plastic, etc.), displayed in midair as a hologram, or displayed on a display (e.g., monitor 106 (FIG. 1)). In various embodiments, GUI 351 can be color, black and white, and/or greyscale. In many embodiments, GUI 351 can comprise an application running on a computer system, such as computer system 100 (FIG. 1), user device 340. In the same or different embodiments, GUI 351 can comprise a website accessed through network 330. In some embodiments, GUI 351 can comprise an eCommerce website. In these or other embodiments, GUI 351 can comprise an administrative (e.g., back end) GUI allowing an administrator to modify and/or change one or more settings in system 300. In the same or different embodiments, GUI 351 can be displayed as or on a virtual reality (VR) and/or augmented reality (AR) system or display. In some embodiments, an interaction with a GUI can comprise a click, a look, a selection, a grab, a view, a purchase, a bid, a swipe, a pinch, a reverse pinch, etc.

Figure 4:
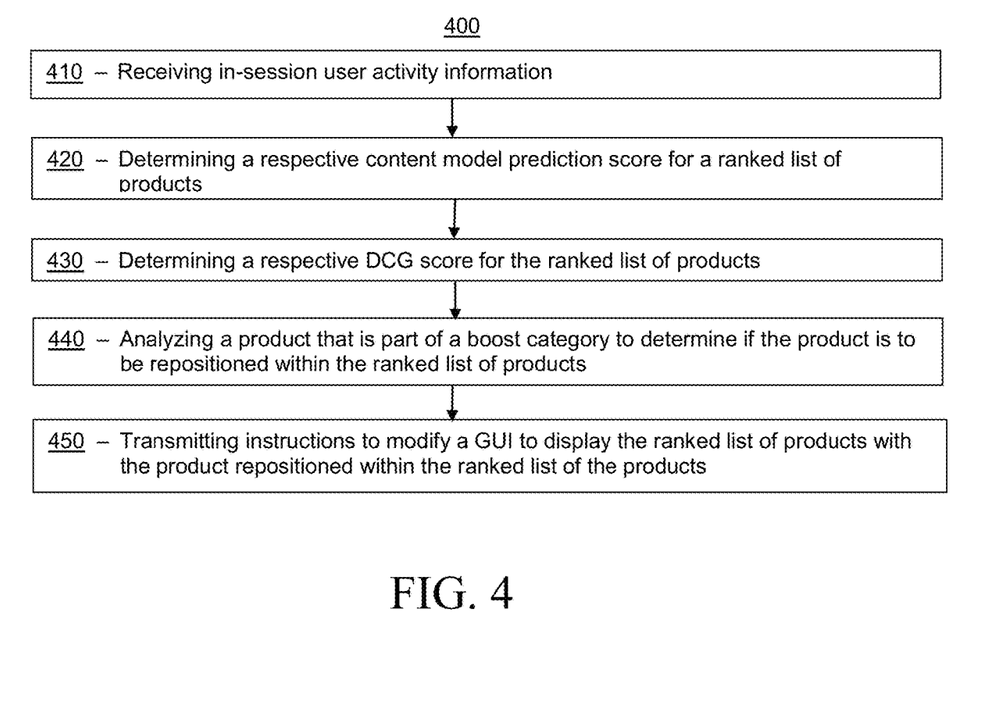
FIG. 4 illustrates a flowchart for a method, according to certain embodiments.

Turning ahead in the drawings, FIG. 4 illustrates a flow chart for a method 400, according to an embodiment. Method 400 is merely exemplary and is not limited to the embodiments presented herein. Method 400 can be employed in many different embodiments or examples not specifically depicted or described herein. In some embodiments, the activities of method 400 can be performed in the order presented. In other embodiments, the activities of method 400 can be performed in any suitable order. In still other embodiments, one or more of the activities of method 400 can be combined or skipped. In many embodiments, system 300 (FIG. 3) can be suitable to perform method 400 and/or one or more of the activities of method 400. In these or other embodiments, one or more of the activities of method 400 can be implemented as one or more computer instructions configured to run at one or more processing modules and configured to be stored at one or more non-transitory memory storage modules. Such non-transitory memory storage modules can be part of a computer system such as search ranking engine 310, web server 320, and/or user device 340 (FIG. 3). The processing module(s) can be similar or identical to the processing module(s) described above with respect to computer system 100 (FIG. 1).

In many embodiments, method 400 can comprise an activity 410 of receiving in-session user activity information. In some embodiments, the in-session user activity information comprises a user search query from a user and a ranked list of products to be displayed to the user based on the user search query. The user can be similar or identical to user 350 (FIG. 3). For example, a user may enter a search query for "milk" and activity 410 receives a ranked list of products based on the "milk" search query that are to be displayed to the user. In some embodiments, a product of the ranked list of products is part of a boost category. In some embodiments, a boost category refers to a product that will be utilized in a boost test, as discussed in more detail below. In embodiments disclosed herein, the boost categories comprise rover, warm-start, and cold start. In some embodiments, the rover boost category has the highest priority, referring to a products potential to be ranked high in a ranked product list; warm-start boost category has the second-highest priority, referring to a lower potential for the product to be ranked high in the ranked product list; and the cold-start boost category has the lowest priority, referring to an unknown potential for the product to be ranked high in the ranked product list.

In some embodiments, the in-session user activity information comprises product information corresponding to the ranked list of the products, a respective ranking score for each of the products of the ranked list of the products, and product interaction information corresponding to the ranked list of the products. In some embodiments, the product information comprises at least one or more of: a product type, a product quality, or a product category. In some embodiments, the product interaction information comprises at least one or more of: user examination of the products, user clicks on the products, or user add-to-carts of the products.

Figure 5:
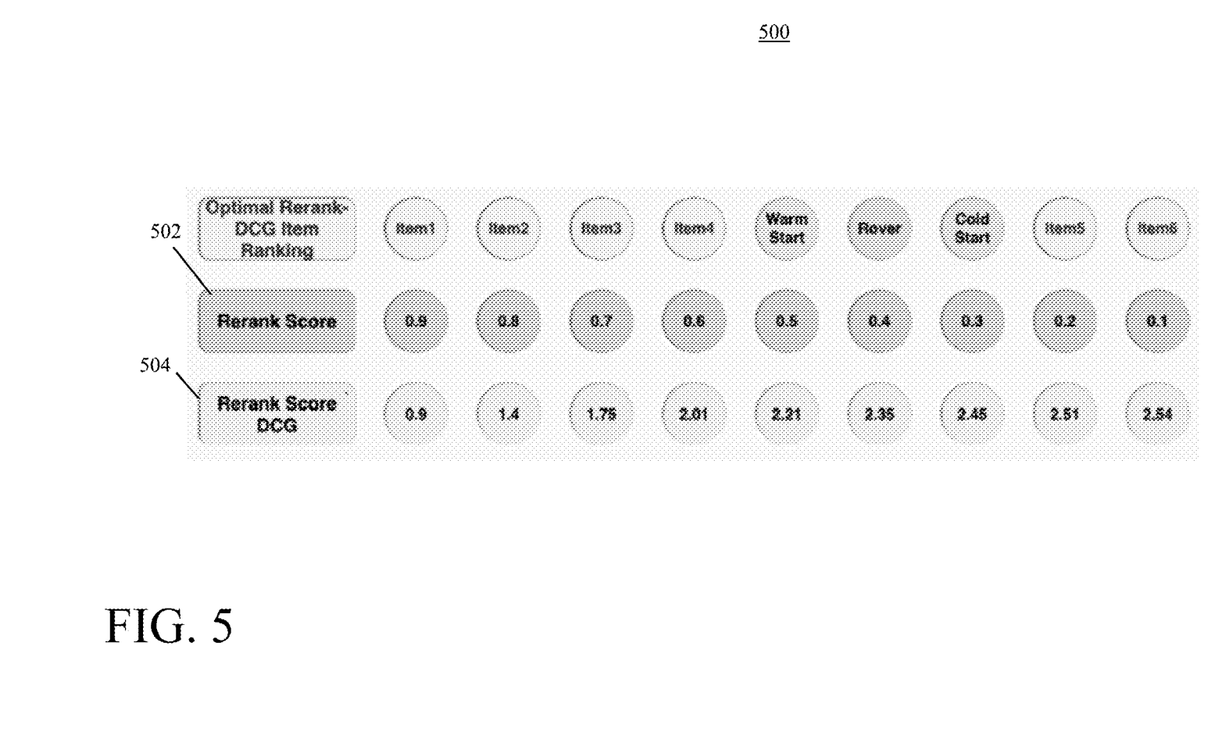
FIG. 5 illustrates an exemplary data relationship, according to certain embodiments.

In some embodiments, the ranked list of products that is received in response to the user search query is given a re-rank score and a re-rank score discounted cumulative gain (DCG) based on the products placement in the ranked list. In some embodiments, each product is given a respective re-rank score. For example, a product that is in the first placement in the ranked list can be given a re-rank score of 0.9 and a re-rank DCG score of 0.9. However, a product that is in the first placement can have another re-rank score based on different ranking criteria. Turning to FIG. 5, a data relationship 500 is illustrated showing the re-rank score 502 and the re-rank DCG score 504 for a ranked list of products (e.g., items) based on the products placement. In the illustrated embodiment, three of the products in the ranked list include a boost category. The re-rank score 502 and the re-rank DCG score 504 based on the products placement are utilized in subsequent processing, as discussed in more detail below.

Returning to FIG. 4, in many embodiments, method 400 can comprise an activity 420 of determining a respective content model prediction score for each of the products of the ranked list of the products. In some embodiments, the content model prediction score is determined using an explore method during an explore mode, or an exploit method during an exploit mode. Activity 420 determines whether to use the explore method or the exploit method based on a user session activity information from a session identifier within a cookie. For example, the session identifier is input to a hash function. In some embodiments, the hash function output is input into a modulo operation such that each session is assigned to one of a number of values. In some embodiments, a portion of the values correspond to explore mode, and a portion of the values correspond to exploit mode. In some embodiments, if a hash sequence (e.g., hash function output assigned value) from the session identifier is less than a threshold, the activity 420 determines to use the explore method. In certain embodiments, when the hash sequence is above the threshold, activity 420 determines to use the exploit method. In certain embodiments, the threshold is 95% of user session traffic. That is, more than 95% of user session identifiers were determined to use the exploit method.

In some embodiments, determining the respective content model prediction score for each of the products of the ranked list of the products during explore mode comprises determining an alpha value using an equation comprising: $\alpha = \hat{c} * k$, where $\hat{c}$ comprises the predicted click through rate of an item for the query and k comprises a real value corresponding to a number of pseudo-examinations for the query item pair. In some embodiments, determining the respective content model prediction score for each of the products of the ranked list of products during explore mode comprises determining a beta value using an equation comprising: $\beta = (1-\hat{c}) * k$. In some embodiments, determining the respective content model prediction score for each of the products of the ranked list of the products during explore mode comprises determining a posterior distribution using the alpha value and the beta value, and determining a sample from the posterior distribution. In some embodiments, the sample from the posterior distribution is the content model prediction score. In some embodiments, the posterior distribution is determined using an equation comprising: posterior distribution=Beta($\alpha$+clicks, $\beta$+examines−clicks), where clicks comprises the number of times the item (e.g., product) has been clicked on from a search results page for the particular query, and examines comprises the number of times the item has been observed in the search results page for the particular query.

In some embodiments, determining the respective content model prediction score for each of the products of the ranked list of the products during exploit mode comprises using an equation comprising:

$$F(\text{click, examine})_i = \frac{\text{click}_i + K * \hat{c}}{\text{examine}_i + K}$$

where, 'i' refers to a single item at an arbitrary position in the ranking list of items (e.g. i=0 to i=n where n is the length of the ranked list), $K_c$ comprises K, and $\hat{p}_c$, comprises $\hat{c}$.

In many embodiments, method 400 can comprise an activity 430 of determining a respective DCG score for the ranked list of products. In some embodiments, activity 430 determines a respective DCG for positions of each of the products of the ranked list of the products. In some embodiments, the DCG scores are based on a position of a product within the ranked list of products based on the products re-rank model score.

In some embodiments, determining the respective DCG score for each of the products of the ranked list of the products further comprises using an equation comprising:

$$DCG_p = \sum_{i=1}^{p} \frac{rel_i}{\log_{2(i+1)}}$$

where P comprises the number of items in the ranked list of items, $rel_i$ comprises the relevance score of the item at position i. Here, the re-ranking model score is relevance score.

In some embodiments, the respective DCG scores are utilized in activity 440, as discussed in more detail below.

In many embodiments, method 400 can comprise an activity 440 of analyzing a product that is part of a boost category to determine if the product is to be repositioned within the ranked list of products. In some embodiments, analyzing the product that is part of the boost category to determine if the product is to be repositioned within the ranked list of the products is based on the respective DCG score for each of the products. In some embodiments, a boost test refers to analyzing a product that is part of a boost category to determine if the product is to be repositioned within the ranked list of products. In some embodiments, analyzing the product that is part of the boost category to determine if the product is to be repositioned within the ranked list of the products comprises identifying a first placement within the ranked list of the products. In some embodiments, the first placement corresponds to a product with a highest rank. In some embodiments, determining which of the products with a boost category to analyze first comprises re-ranking the products with a boost category by their respective content model prediction score. In some embodiments, when the products with a boost category have been re-ranked by their content model predication score, activity 440 receives a DCG score for the product with the highest rank. For example, a product with a rover boost category and the highest content model prediction score is determined to the first product to be analyzed to determine if the product is to be repositioned within the ranked list of products.

In some embodiments, determining if the product is to be repositioned within the ranked list of the products comprises comparing the DCG score for the product that is part of the boost category to a boost test threshold. In some embodiments, determining if a product is to be repositioned comprises comparing the re-rank DCG at position 'j' using the ranking up to position 'j−1' and the product to be boosted at position 'j' against the re-rank DCG at position of the ranking which places the products with the top 'j' re-rank scores in descending order according to their re-rank scores. In embodiments disclosed herein, the boost test threshold comprises [(1−.s)*DCG for an ith placement]. In some embodiments, s comprises the amount of slack the algorithm is permitted for deviating from the ordering of items that produces the optimal re-rank score DCG. For example, s can be a value of 0.1, 0.01, 0.06, etc. In some embodiments, activity 440 determines that the product that is part of the boost category is to be repositioned to the first placement when the DCG score for the product that is part of the boost category is greater than the boost test threshold.

Figure 6:
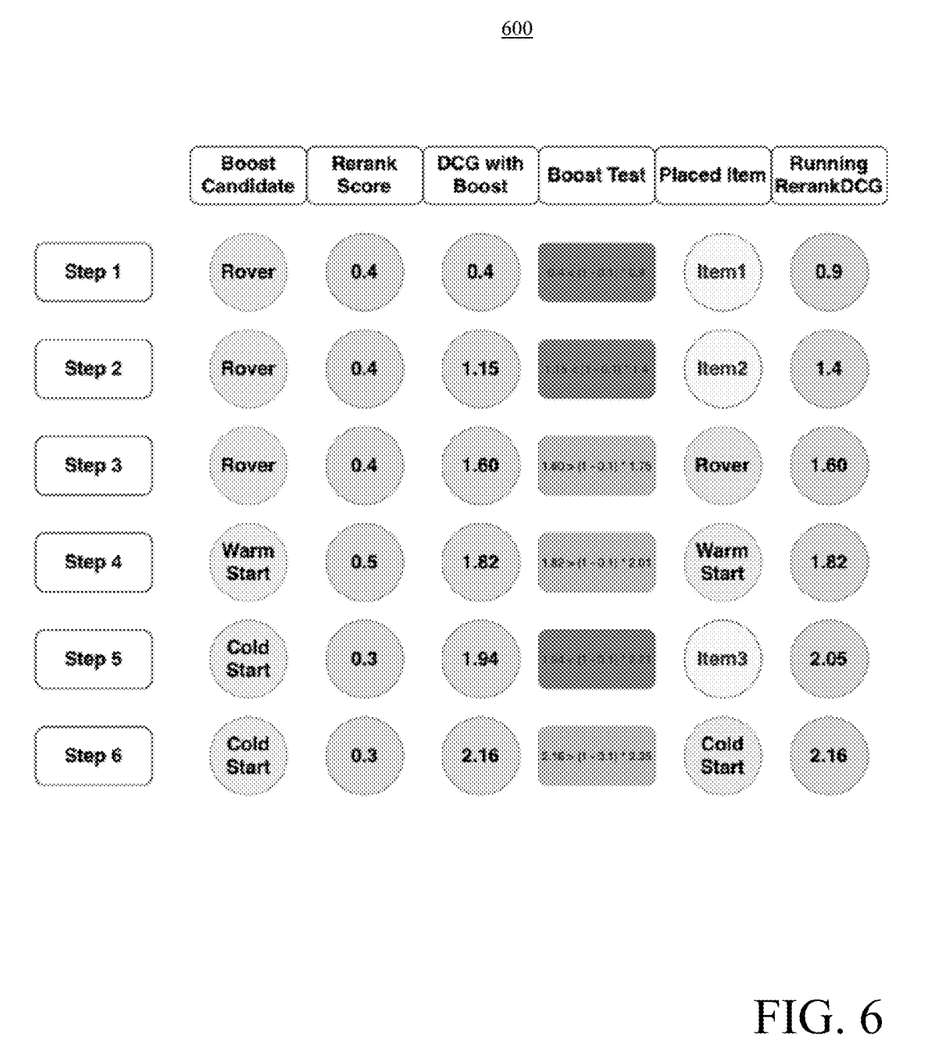
FIG. 6 illustrates an exemplary boost test, according to certain embodiments.

Turning to FIG. 6, an exemplary boost test 600 is illustrated. In the illustrated boost test 600 a product with a boost category of rover is determined to be the first product to be analyzed during the boost test based on the products content model prediction score. As shown in the illustrated embodiment, during step 1 the DCG score for the product with the rover boost category is not greater than the boost test threshold. Accordingly, the product with the rover boost category is not repositioned with the first placement on the ranked product list. Similarly, during step 2, the DCG score for the product with the rover boost category is not greater than the boost test threshold, and the product with the rover boost category is not repositioned with the second placement on the ranked product list. In the illustrated embodiment, during step 3, the DCG score for the product with the rover boost category is greater than the boost test threshold, and the product with the rover boost category is repositioned with the third placement on the ranked product list. Turning briefly back to FIG. 5, the product with the rover boost category was originally ranked in the six placement, and is now being repositioned to be in the third placement when presented to a user. The boost test is performed for the remaining products with a boost category.

Returning to activity 440 of FIG. 4, in some embodiments, the boost test can be performed with a buffer. For example, the first buffer can comprise a product with a rover boost category and a product with a warm start category. In such an embodiment, the boost test will be performed first with the product with the rover boost category with the first placement, and if the DCG score for the product with the rover boost category is less than the boost test threshold, the boost test is performed with the product with the warm-start boost category with the first placement. If the DCG score for the product with the warm-start boost category is greater than the boost test threshold, the product with the warm-start boost category is repositioned to the first placement, and the product with the rover boost category is coupled with a product with the cold-start boost category for the next buffer and the boost test is performed on the buffer at the next placement. If the DCG score for the product with the warm-start boost category is not greater than the boost test threshold, the boost test is performed in a similar manner at the second placement with the buffer of the product with the rover boost category and the product with the warm-start boost category.

In many embodiments, method 400 can comprise an activity 450 of transmitting instructions to modify a GUI to display the ranked list of products with the product repositioned within the ranked list of products. The GUI can be similar or identical to GUI 351 (FIG. 3). In some embodiments, in response to determining that the product that is part of the boost category is to be repositioned, activity 450 transmits instructions to modify a graphical user interface to display the ranked list of the products with the product repositioned within the ranked list of the products. In some embodiments, more than one product with a boost category can be repositioned within the ranked list of products.

Returning to FIG. 3, in several embodiments, communication system 311 can at least partially perform activity 410 (FIG. 4).

In several embodiments, evaluation system 312 can at least partially perform activity 420 (FIG. 4) and/or activity 430 (FIG. 4).

In a number of embodiments, analysis system 313 can at least partially perform activity 440 (FIG. 4) and/or activity 450 (FIG. 4).

In a number of embodiments, web server 320 can at least partially perform method 400 (FIG. 4).

Embodiments disclosed herein are directed to systems and methods for re-ranking items to display to a user based on the user's initial search query. Prior techniques re-ranked product items by static repositioning. That is, a placement is pre-determined to receive a product regardless of any analysis. Such techniques cause frustration for a user and burden the computing system with additional queries that a user may input to find a product they are looking for. Embodiments disclosed herein analyze search queries and ranked list of products to determine an efficient repositioning of products within the ranked list of products.

In many embodiments, the techniques described herein can provide a practical application and several technological improvements. In some embodiments, the techniques described herein can provide for altering of a graphical user interface to display ranked products based on a boost test. Such a boost test improves the efficiency of the computing system as users may not input additional queries.

In many embodiments, the techniques described herein can be used continuously at a scale that cannot be reasonably performed using manual techniques or the human mind. For example, processing millions of search queries and ranked products within milliseconds cannot be feasibly completed by a human.

In a number of embodiments, the techniques described herein can solve a technical problem that arises only within the realm of computer networks, as queries and ranked products do not exist outside the realm of computer networks.

In many embodiments, the techniques described herein can solve a technical problem in a related field that cannot be solved outside the context of computer networks. Specifically, the techniques described herein cannot be used outside the context of computer networks due to a lack of data and because the ranked last of products and boost test cannot be operated without a computer system and/or network.

Although systems and methods for altering a graphical user interface based on exploration of search query ranking have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-6 may be modified, and that the foregoing discussion of certain of these embodiments does not necessarily represent a complete description of all possible embodiments. For example, one or more of the procedures, processes, or activities of FIG. 4 may include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
   one or more processors; and
   one or more non-transitory computer-readable media storing computing instructions that, when executed on the one or more processors, perform:
   receiving in-session user activity information, the in-session user activity information comprising a user search query from a user and a ranked list of products to be displayed to the user based on the user search query, and a product of the products being part of a boost category, wherein the user search query is received via a graphical user interface that is in a first display state;
   determining a respective content model prediction score for each of the products of the ranked list of the products;
   determining a respective discounted cumulative gain (DCG) score for positions of each of the products of the ranked list of the products based on a respective re-rank model score;
   analyzing the product that is part of the boost category to determine if the product is to be repositioned within the ranked list of the products based on the respective DCG score for each of the products; and
   in response to determining that the product that is part of the boost category is to be repositioned, transmitting instructions to modify the graphical user interface to display the ranked list of the products with the product repositioned within the ranked list of the products, wherein the ranked listed of the products is displayed via the graphical user interface in a second display state, the second display state to be different than the first display state.

2. The system of claim 1, wherein the in-session user activity information further comprises product information corresponding to the ranked list of the products, a respective ranking score for each of the products of the ranked list of the products, and product interaction information corresponding to the ranked list of the products.

3. The system of claim 2, wherein the product information comprises at least one or more of: a product type, a product quality, or a product category.

4. The system of claim 2, wherein the product interaction information comprises at least one or more of: user examination of the products, user clicks on the products, or user add-to-carts of the products.

5. The system of claim 1, wherein determining the respective content model prediction score for each of the products of the ranked list of the products further comprises determining an alpha value using an equation comprising: $\alpha = \hat{c}*k$, where $\hat{c}$ comprises a predicted click through rate of an item for a query and k comprises a real value corresponding to a number of pseudo-examinations for a query item pair.

6. The system of claim 5, wherein determining the respective content model prediction score for each of the products of the ranked list of the products further comprises determining a beta value using an equation comprising: $\beta = (1-\hat{c})*k$.

7. The system of claim 6, wherein determining the respective content model prediction score for each of the products of the ranked list of the products further comprises:
   determining a posterior distribution using the alpha value and the beta value; and
   determining a sample from posterior distribution, wherein the sample is the respective content model prediction score.

8. The system of claim 7, wherein the posterior distribution is determined using an equation comprising: posterior distribution=Beta($\alpha$+clicks, $\beta$+examines−clicks), where clicks comprises a number of times a product has been clicked on from a search results page for a particular query, and examines comprises a number of times a product has been observed in the search results page for the particular query.

9. The system of claim 1, wherein determining the respective DCG score for each of the products of the ranked list of the products further comprises using an equation comprising:

$$DCG_p = \Sigma_{i=1}^{p} \frac{rel_i}{\log_{2(i+1)}},$$

where P comprises a number of the products in the ranked list of the products, $rel_i$ comprises a relevance score of a product at position i.

10. The system of claim 1, wherein analyzing the product that is part of the boost category to determine if the product is to be repositioned within the ranked list of the products further comprises:
    identifying a first placement within the ranked list of the products, the first placement corresponding to a first product with a highest rank;
    receiving a DCG score for the first product with the highest rank;
    comparing the DCG score for the first product that is part of the boost category to a boost test threshold, wherein the boost test threshold comprises [(1−s)*DCG for an ith placement]; and
    determining that the first product that is part of the boost category is to be repositioned to the first placement when the DCG score for the first product that is part of the boost category is greater than the boost test threshold.

11. A method implemented via execution of computing instructions configured to run at one or more processors and configured to be stored at non-transitory computer-readable media, the method comprising:
    receiving in-session user activity information, the in-session user activity information comprising a user search query from a user and a ranked list of products to be displayed to the user based on the user search query, and a product of the products being part of a boost category, wherein the user search query is received via a graphical user interface that is in a first display state;
    determining a respective content model prediction score for each of the products of the ranked list of the products;
    determining a respective discounted cumulative gain (DCG) score for positions of each of the products of the ranked list of the products based on a respective re-rank model score;
    analyzing the product that is part of the boost category to determine if the product is to be repositioned within the ranked list of the products based on the respective DCG score for each of the products; and
    in response to determining that the product that is part of the boost category is to be repositioned, transmitting instructions to modify the graphical user interface to display the ranked list of the products with the product repositioned within the ranked list of the products, wherein the ranked listed of the products is displayed via the graphical user interface in a second display state, the second display state to be different than the first display state.

12. The method of claim 11, wherein the in-session user activity information further comprises product information corresponding to the ranked list of the products, a respective ranking score for each of the products of the ranked list of the products, and product interaction information corresponding to the ranked list of the products.

13. The method of claim 12, wherein the product information comprises at least one or more of: a product type, a product quality, or a product category.

14. The method of claim 12, wherein the product interaction information comprises at least one or more of: user examination of the products, user clicks on the products, or user add-to-carts of the products.

15. The method of claim 11, wherein determining the respective content model prediction score for each of the products of the ranked list of the products further comprises determining an alpha value using an equation comprising: $\alpha = \hat{c} \cdot k$, where $\hat{c}$ comprises a predicted click through rate of an item for a query and k comprises a real value corresponding to a number of pseudo-examinations for a query item pair.

16. The method of claim 15, wherein determining the respective content model prediction score for each of the products of the ranked list of the products further comprises determining a beta value using an equation comprising: $\beta = (1-\hat{c}) \cdot k$.

17. The method of claim 16, wherein determining the respective content model prediction score for each of the products of the ranked list of the products further comprises:
    determining a posterior distribution using the alpha value and the beta value; and
    determining a sample from posterior distribution, wherein the sample is the respective content model prediction score.

18. The method of claim 17, wherein the posterior distribution is determined using an equation comprising: posterior distribution=Beta($\alpha$+clicks, $\beta$+examines−clicks), where clicks comprises a number of times a product has been clicked on from a search results page for a particular query, and examines comprises a number of times a product has been observed in the search results page for the particular query.

19. The method of claim 11, wherein determining the respective DCG score for each of the products of the ranked list of the products further comprises using an equation comprising:

$$DCG_p = \Sigma_{i=1}^{p} \frac{rel_i}{\log_{2(i+1)}},$$

where P comprises a number of the products in the ranked list of the products, $rel_i$ comprises a relevance score of a product at position i.

20. The method of claim 11, wherein analyzing the product that is part of the boost category to determine if the product is to be repositioned within the ranked list of the products further comprises:
    identifying a first placement within the ranked list of the products, the first placement corresponding to a first product with a highest rank;
    receiving a DCG score for the first product with the highest rank;
    comparing the DCG score for the first product that is part of the boost category to a boost test threshold, wherein the boost test threshold comprises [(1−s)*DCG for an ith placement]; and
    determining that the first product that is part of the boost category is to be repositioned to the first placement when the DCG score for the first product that is part of the boost category is greater than the boost test threshold.

* * * * *